ns011738782B2

US011738782B2

(12) United States Patent
Li et al.

(10) Patent No.: US 11,738,782 B2
(45) Date of Patent: Aug. 29, 2023

(54) ACTIVATION CONTROL METHOD AND APPARATUS FOR RAILWAY TRAIN (71) Applicant: CRRC QINGDAO SIFANG CO., LTD., Qingdao (CN)

(72) Inventors: Xingguo Li, Qingdao (CN); Tai Liu, Qingdao (CN); Huiqing Zhang, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 1311 days.

(21) Appl. No.: 16/304,734

(22) PCT Filed: Sep. 29, 2018

(86) PCT No.: PCT/CN2018/108719
§ 371 (c)(1),
(2) Date: Nov. 27, 2018

(87) PCT Pub. No.: WO2019/214151
PCT Pub. Date: Nov. 14, 2019

(65) Prior Publication Data
US 2021/0221406 A1    Jul. 22, 2021

(30) Foreign Application Priority Data

May 11, 2018  (CN) .......................... 201810450847.8

(51) Int. Cl.
*B61C 17/00* (2006.01)
*B60T 13/74* (2006.01)
*B61H 13/00* (2006.01)

(52) U.S. Cl.
CPC .............. *B61C 17/00* (2013.01); *B60T 13/74* (2013.01); *B61H 13/00* (2013.01)

(58) Field of Classification Search
CPC ......... B61C 17/00; B61C 17/12; B60T 13/74; B61H 13/00; B61L 15/0072; B61L 15/0063
See application file for complete search history.

(56) References Cited

U.S. PATENT DOCUMENTS 4,652,057 A *  3/1987  Engle .................... B60T 13/665
                                                         303/3
9,481,348 B2 * 11/2016  Wolf ..................... B60T 17/228
(Continued)

FOREIGN PATENT DOCUMENTS

CN       102476647     *  3/2014   ............. B61C 17/12

OTHER PUBLICATIONS

Translation of CN 102476647, Yingshuai et al, W., Dalian Locomotive and Rolling Stock, Mar. 26, 2014, pp. 1-2. (Year: 2014).*

*Primary Examiner* — Russell Frejd
(74) *Attorney, Agent, or Firm* — CANTOR COLBURN LLP (57) ABSTRACT Disclosed are an activation control method and apparatus for a railway train. The method includes that: at least one activation request sent by at least one motorman controller of a railway train is received; a number of at least one motorman controller sending the at least one activation request is determined; when there are a plurality of motorman controllers sending the at least one activation request, the railway train is controlled to perform an emergency braking; and when there is one motorman controller sending the at least one activation request, it is determined that a target motorman controller has a permission to control the railway train, wherein the target motorman controller is a unique motorman controller sending the at least one activation request. The present disclosure solves the problem in
(Continued)

the related art of potential safety hazard of a double-vehicle activation processing method.

10 Claims, 3 Drawing Sheets

(56) References Cited

U.S. PATENT DOCUMENTS

| | | | | |
|---|---|---|---|---|
| 2005/0027410 A1* | 2/2005 | Kanner | .................. | B61L 27/57 |
| | | | | 701/19 |
| 2012/0004796 A1* | 1/2012 | Michaut | .................. | B61L 27/12 |
| | | | | 701/19 |
| 2017/0151969 A1* | 6/2017 | Jovenall | .................. | B61L 27/40 |
| 2020/0114940 A1* | 4/2020 | Gao | ........................ | B61L 11/08 |

* cited by examiner

ACTIVATION CONTROL METHOD AND APPARATUS FOR RAILWAY TRAIN

TECHNICAL FIELD

The present disclosure relates to the field of railway trains, and in particular to an activation control method and apparatus for a railway train.

BACKGROUND

In the technical field of railway trains, a current double-vehicle activation processing mode is: ignoring a second activation request, and maintaining the original state of a vehicle such as traction, coasting and braking.

However, the above technical solution has the following technical problems: when a vehicle key corresponds to a first activation request is pulled away and a vehicle key hole corresponds to another activation request is at an open position, a vehicle of which the vehicle key hole is at the open position will be automatically activated to allow the vehicle to have a permission to directly drive the train. Therefore, the above double-vehicle activation processing method has a potential safety hazard.

An effective solution has not been proposed yet currently for the problem in the related art of potential safety hazard of a double-vehicle activation processing method.

SUMMARY

At least some embodiments of the present disclosure provides an activation control method and apparatus for a railway train, intended to solve the problem in the related art of potential safety hazard of a double-vehicle activation processing method.

In an embodiment of the present disclosure, an activation control method for a railway train is provided. The method includes that: at least one activation request sent by at least one motorman controller of the railway train is received; a number of at least one motorman controller sending the at least one activation request is determined; when there are a plurality of motorman controllers sending the at least one activation request, the railway train is controlled to perform an emergency braking; and when there is one motorman controller sending the at least one activation request, it is determined that a target motorman controller has a permission to control the railway train, wherein the target motorman controller is a unique motorman controller sending the at least one activation request.

Optionally, a condition of triggering at least one motorman controller of the railway train to send at least one activation request includes that: when a key hole of the motorman controller of the railway train is at an open position, the motorman controller of the railway train sends at least one activation request.

Optionally, after the railway train is controlled to perform an emergency braking, in the activation control method for a railway train provided by the embodiment of the present disclosure, the method further includes that: when it is determined that the key hole of each motorman controller of the railway train is at a closed position, the step of receiving at least one activation request sent by at least one motorman controller of the railway train is continuously performed.

Optionally, before at least one activation request sent by at least one motorman controller of the railway train is received, the method further includes that: state information of the railway train is received, wherein the state information is used for representing a current state of the railway train; and when it is determined that the state information of the railway train satisfies a preset condition, the step of receiving at least one activation request sent by at least one motorman controller of the railway train is continuously performed.

Optionally, when there is one motorman controller sending the at least one activation request, the operation that it is determined that a target motorman controller has a permission to control the railway train includes that: when there is one motorman controller sending the at least one activation request, a circuit signal is sent to a target relay, the target relay corresponds to the target motorman controller; and after the target relay receives the circuit signal, a communication connection between the target motorman controller and a control communication network of the railway train is established, the control communication network is used for transmitting at least one control signal of the railway train.

Optionally, after the target relay receives the circuit signal, the method further includes that: a train line of the railway train is powered on; and when it is determined that the train line of the railway train has been powered on, target information is fed back, the target information is used for representing that the target motorman controller has controlled the railway train.

According to an aspect of the disclosure, an activation control apparatus for a railway train is provided. The apparatus includes: a first receiving element, configured to receive at least one activation request sent by at least one motorman controller of the railway train; a first determining element, configured to determine a number of at least one motorman controller sending the at least one activation request; a control element, configured to control, when there are a plurality of motorman controllers sending the at least one activation request, the railway train to perform an emergency braking; and a second determining element, configured to determine that, when there is one motorman controller sending the at least one activation request, a target motorman controller has a permission to control the railway train, wherein the target motorman controller is a unique motorman controller sending the at least one activation request.

Optionally, a condition of triggering at least one motorman controller of the railway train to send at least one activation request includes that: when a key hole of the motorman controller of the railway train is at an open position, the motorman controller of the railway train sends at least one activation request.

To achieve the foregoing objective, According to an aspect of the disclosure, a storage medium is provided. The storage medium includes a stored program, wherein the program performs the activation control method for a railway train according to any one of the above contents.

To achieve the foregoing objective, According to an aspect of the disclosure, a processor is provided. The processor is configured to run a program, wherein the program is run to perform the activation control method for a railway train according to any one of the above contents.

The present disclosure adopts the following steps that: at least one activation request sent by at least one motorman controller of the railway train is received; a number of at least one motorman controller sending the at least one activation request is determined; when there are a plurality of motorman controllers sending the at least one activation request, the railway train is controlled to perform an emergency braking; and when there is one motorman controller sending the at least one activation request, it is determined that a target motorman controller has a permission to control the railway train, wherein the target motorman controller is a unique motorman controller sending the at least one activation request. The problem in the related art of potential safety hazard of a double-vehicle activation processing method is solved. Thus, the effect of guaranteeing the safe drive of the railway train is achieved.

BRIEF DESCRIPTION OF THE DRAWINGS

The drawings forming a part of the present disclosure are intended to provide a further understanding of the present disclosure. The schematic embodiments and illustrations of the present disclosure are intended to explain the present disclosure, and do not form improper limits to the present disclosure. In the drawings.

DETAILED DESCRIPTION OF THE EMBODIMENTS

It is to be noted that in the case of no conflict, the features in the embodiments and the embodiments in the present disclosure may be combined with each other. The present disclosure will be illustrated below with reference to the drawings and in conjunction with the embodiments in detail.

In order to make those skilled in the art better understand the solutions of the present disclosure, the technical solutions in the embodiments of the present disclosure will be clearly and completely described below with reference to the drawings in the embodiments of the present disclosure. It is apparent that the described embodiments are only a part of the embodiments of the present disclosure, not all of the embodiments. On the basis of the embodiments of the present disclosure, all other embodiments obtained on the premise of no creative work of those skilled in the art fall within the scope of protection of the present disclosure.

According to an embodiment of the present disclosure, an activation control method for a railway train is provided.

Figure 1:
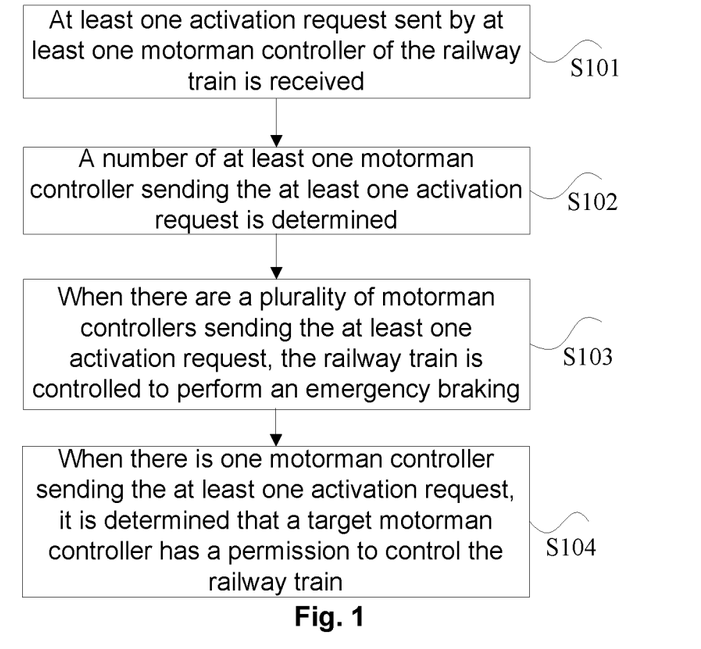
FIG. 1 shows a flowchart of an activation control method for a railway train according to an embodiment of the present disclosure.

FIG. 1 is a flowchart of an activation control method for a railway train according to an embodiment of the present disclosure. As shown in FIG. 1, the method includes the steps as follows.

At step S101, at least one activation request sent by at least one motorman controller of the railway train is received.

As an optional example, in the activation control method for a railway train provided by the embodiment of the present disclosure, a condition of triggering at least one motorman controller of the railway train to send at least one activation request includes that: when a key hole of the motorman controller of the railway train is at an open position, the motorman controller of the railway train sends at least one activation request.

In addition, the condition of triggering at least one motorman controller of the railway train to send at least one activation request may also be that: when the motorman controller of the railway train receives a target instruction and after the target instruction is validated, the motorman controller of the railway train sends at least one activation request.

It is to be noted that the above target instruction may be a voice instruction, that is, after the voice instruction passes a sound ray validation, the motorman controller of the railway train sends at least one activation request. In addition, the above target instruction may also be a target fingerprint, that is, after the target fingerprint is validated, the motorman controller of the railway train sends at least one activation request. In addition, the above target instruction may also be a target iris, that is, after the target iris is validated, the motorman controller of the railway train sends at least one activation request. No specific limitations are made herein.

For the multiple examples, optionally, in the activation control method for a railway train provided by the embodiment of the present disclosure, the operation that at least one activation request sent by at least one motorman controller of the railway train is received may be that: at least one activation request sent by at least one motorman controller of the railway train is received, wherein the at least one activation request may be a network signal or a circuit signal.

In order to reduce the potential safety hazard of the railway train, optionally, in the activation control method for a railway train provided by the embodiment of the present disclosure, before at least one activation request sent by at least one motorman controller of the railway train is received, the method further includes that: state information of the railway train is received, wherein the state information is used for representing a current state of the railway train; and when it is determined that the state information of the railway train satisfies a preset condition, the step of receiving at least one activation request sent by at least one motorman controller of the railway train is continuously performed.

It is to be noted that before at least one activation request sent by at least one motorman controller of the railway train is received, it is necessary to preliminarily judge the state information of the railway train, in order to determine whether various statees of the railway train meet the safety standard. That is, only when various statees of the railway train meet the safety standard, the step of receiving at least one activation request sent by at least one motorman controller of the railway train is further performed. Thus, the technical effect of multiply guaranteeing the safe drive of the railway train is achieved, thereby avoiding the problem of potential safety hazard of the railway train.

As an optional example, the state information includes at least one of the following: passenger capacity of the railway train, an electrical state of the railway train, or the like.

At step S102, a number of at least one motorman controller sending the at least one activation request is determined.

It is to be noted that a condition of triggering at least one motorman controller of the railway train to send at least one activation request includes that: when a key hole of the motorman controller of the railway train is at an open position, the motorman controller of the railway train sends at least one activation request. The operation that a number of at least one motorman controller sending the at least one activation request is determined may be that: counting is started from where key holes of all motorman controllers of the railway train are at closed positions, that is, after key holes of all motorman controllers of the railway train are at closed positions, the number of corresponding motorman controllers that receive the at least one activation request is determined.

In addition, the condition of triggering at least one motorman controller of the railway train to send at least one activation request may also be that: when the motorman controller of the railway train receives a target instruction and after the target instruction is validated, the motorman controller of the railway train sends at least one activation request. The operation that a number of at least one motorman controller sending the at least one activation request is determined may be that: when the railway train receives a trigger signal of a reset button, a number of at least one motorman controller sending the at least one activation request after the trigger signal is received starts to be determined.

At step S103, when there are a plurality of motorman controllers sending the at least one activation request, the railway train is controlled to perform an emergency braking.

That is, after at least one activation request sent by at least one motorman controller is received, at least one activation request sent by another motorman controller is also received, the at least one activation request sent by the second motorman controller is ignored, and the railway train is controlled to start an emergency braking, thus avoiding the situation that multiple motorman controllers have a permission to control the railway train simultaneously, or avoiding the situation that the second motorman controller is automatically endowed with a permission to control the railway train after the first motorman controller closes control over the railway train, so as to achieve the technical effect of guaranteeing the safe drive of the railway train.

Further, after the railway train is controlled to perform an emergency braking, in the activation control method for a railway train provided by the embodiment of the present disclosure, the method further includes that: when it is determined that the key hole of each motorman controller of the railway train is at a closed position, the step of receiving at least one activation request sent by at least one motorman controller of the railway train is continuously performed.

That is, after the railway train has an emergency braking due to the fact that multiple motorman controllers send the at least one activation request, only when key holes of the multiple motorman controllers are provided at closed positions, the at least one activation request sent by the motorman controllers may be received again. That is, only when key holes of multiple motorman controllers are at closed positions, the at least one activation request sent by the motorman controllers can be received, and only the motorman controller uniquely sending the at least one activation request has a permission to control the railway train.

At step S104, when there is one motorman controller sending the at least one activation request, it is determined that a target motorman controller has a permission to control the railway train, wherein the target motorman controller is a unique motorman controller sending the at least one activation request.

It is to be noted that when it is determined that there is one motorman controller sending the at least one activation request, it is determined that the motorman controller uniquely sending the at least one activation request has a permission to control the railway train; and after the at least one activation request sent by one or more motorman controllers is received at this time, the railway train is controlled to perform an emergency braking.

In order to ensure that the motorman controller has a permission to control the railway train, optionally, in the activation control method for a railway train provided by the embodiment of the present disclosure, when there is one motorman controller sending the at least one activation request, the operation that it is determined that a target motorman controller has a permission to control the railway train includes that: when there is one motorman controller sending the at least one activation request, a circuit signal is sent to a target relay, the target relay corresponds to the target motorman controller; and after the target relay receives the circuit signal, a communication connection between the target motorman controller and a control communication network of the railway train is established, the control communication network is used for transmitting at least one control signal of the railway train.

It is to be noted that the control communication network may be a circuit communication network, or a network communication network, or a combination of the circuit communication network and the network communication network, which is not specifically limited herein.

It is to be noted that the target relay is used for establishing a communication connection between the target motorman controller and the control communication network of the railway train according to the received circuit signal, and each motorman controller has a corresponds relay.

Figure 2:
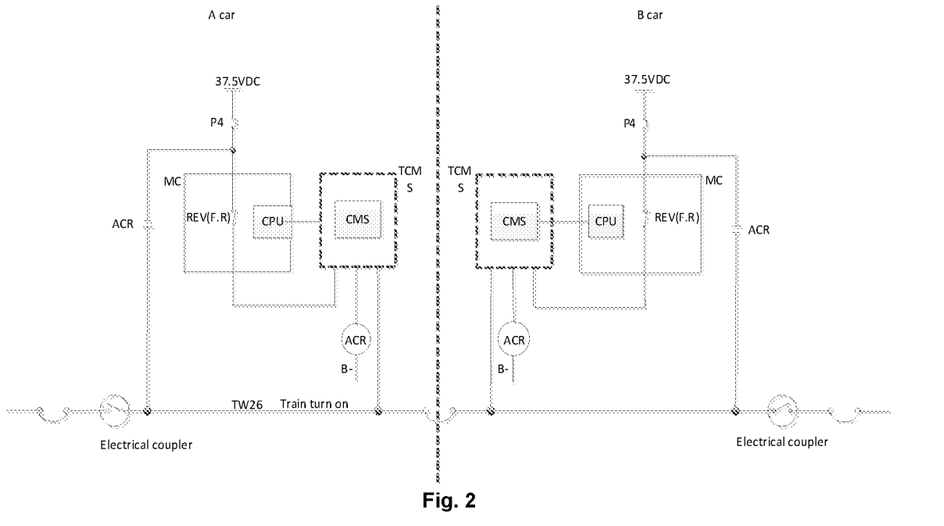
FIG. 2 shows a circuit diagram of an optional activation control method for a railway train according to an embodiment of the present disclosure.

FIG. 2 is a circuit diagram of an optional activation control method for a railway train according to an embodiment of the present disclosure. P4 in the figure represents a miniature circuit breaker of at least one motorman controller, MC in the figure represents the motorman controller, REV (F, R) in the figure represents a key hole (forward, backward), CPU in the figure represents an internal communication board card of the motorman controller, CMS in the figure represents a network system local control element, ACR in the figure represents an activation control relay, TW26 in the figure represents a train line for train activation, and a TCMS system in the figure represents a train control and monitoring system. As shown in FIG. 2, TCMS is connected to REV (F, R) and ACR, and when TCMS receives a REV (F, R) signal and receives only one REV (F, R) signal, TCMS triggers ACR, wherein as an optional example, a circuit signal indicating that TCMS triggers ACR may be: current of 37.5V 1000 mA.

Figure 3:
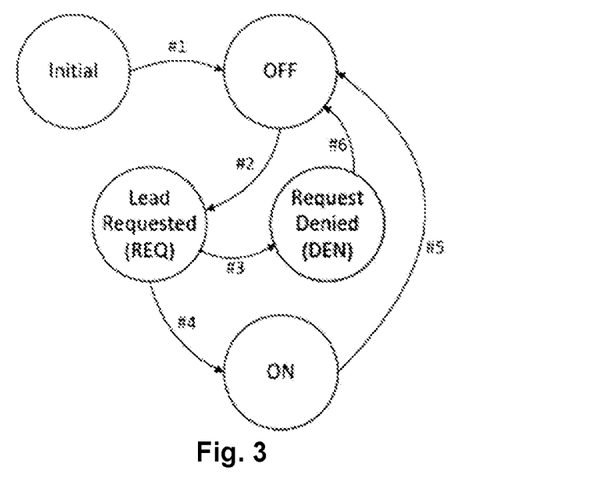
FIG. 3 shows a state transition diagram of an optional activation control method for a railway train according to an embodiment of the present disclosure.

FIG. 3 is a state transition diagram of an optional activation control method for a railway train according to an embodiment of the present disclosure. As shown in FIG. 3, when a railway train is in a non-activated state (OFF) and at least one activation request (Lead Requested) is received, the railway train is switched to an activated state (ON), if at least one activation request (Request Denied) is received again, the railway train is switched to the non-activated state (OFF).

It is to be noted that in order to reduce the potential safety hazard of the railway train, after the target relay receives the circuit signal, the method further includes that: a train line of the railway train is powered on; and when it is determined that the train line of the railway train has been powered on, target information is fed back, the target information is used for representing that the target motorman controller has controlled the railway train.

That is, after the train line of the railway train is powered on, the power-on condition of the train line of the railway train is continuously detected, and it is detected whether the target motorman controller has controlled the railway train. When the train line of the railway train is normally powered on and the target motorman controller has normally controlled the railway train, the detection result is fed back. The control information of the railway train can be mastered in time, thus avoiding an accident.

As an optional example, when the railway train is normally powered on, the target motorman controller has been already permitted to control the railway train.

As an optional example, the target information further includes: a connection condition of the control communication network of the railway train, wherein the connection condition at least includes: a connection device of the control communication network.

The activation control method for a railway train provided by the embodiment of the present disclosure includes that: at least one activation request sent by at least one motorman controller of a railway train is received; a number of at least one motorman controller sending the at least one activation request is determined; when there are a plurality of motorman controllers sending the at least one activation request, the railway train is controlled to perform an emergency braking; and when there is one motorman controller sending the at least one activation request, it is determined that a target motorman controller has a permission to control the railway train, wherein the target motorman controller is a unique motorman controller sending the at least one activation request. The problem in the related art of potential safety hazard of a double-vehicle activation processing method is solved. Thus, the effect of guaranteeing the safe drive of the railway train is achieved.

It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The embodiment of the present disclosure also provides an activation control apparatus for a railway train. It is to be noted that the activation control apparatus for a railway train in the embodiment of the present disclosure may be configured to perform the activation control method for a railway train according to the embodiment of the present disclosure. The activation control apparatus for a railway train according to the embodiment of the present disclosure will be introduced below.

Figure 4:
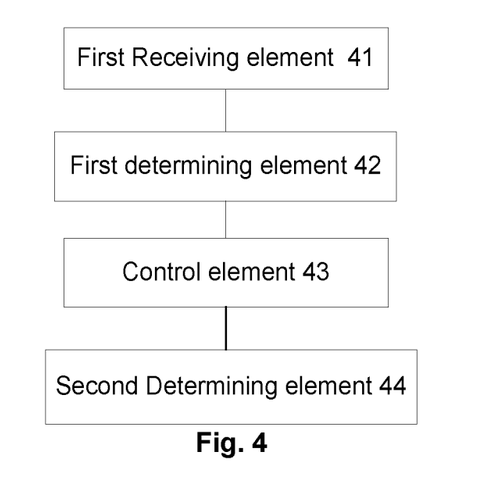
FIG. 4 shows a schematic diagram of an activation control apparatus for a railway train according to an embodiment of the present disclosure.

FIG. 4 is a schematic diagram of an activation control apparatus for a railway train according to an embodiment of the present disclosure. As shown in FIG. 4, the apparatus includes: a first receiving element 41, a first determining element 42, a control element 43, and a second determining element 44.

The first receiving element 41 is configured to receive at least one activation request sent by at least one motorman controller of the railway train.

The first determining element 42 is configured to determine a number of at least one motorman controller sending the at least one activation request.

The control element 43 is configured to control, when there are a plurality of motorman controllers that send the at least one activation request, the railway train to perform an emergency braking.

The second determining element 44 is configured to determine that, when there is one motorman controller sending the at least one activation request, a target motorman controller has a permission to control the railway train, wherein the target motorman controller is a unique motorman controller sending the at least one activation request.

Optionally, in the activation control apparatus for a railway train provided by the embodiment of the present disclosure, a condition of triggering at least one motorman controller of the railway train to send at least one activation request includes that: when a key hole of the motorman controller of the railway train is at an open position, the motorman controller of the railway train sends at least one activation request.

Optionally, in the activation control apparatus for a railway train provided by the embodiment of the present disclosure, the apparatus further includes: a third determining element, configured to continuously perform, when it is determined that the key hole of each motorman controller of the railway train is at a closed position, the step of receiving at least one activation request sent by at least one motorman controller of the railway train after the railway train is controlled to perform an emergency braking.

Optionally, in the activation control apparatus for a railway train provided by the embodiment of the present disclosure, the apparatus further includes: a second receiving element, configured to receive, before at least one activation request sent by at least one motorman controller of the railway train is received, state information of the railway train, wherein the state information is used for representing a current state of the railway train; and a fourth determining element, configured to continuously perform, when it is determined that the state information of the railway train satisfies a preset condition, the step of receiving at least one activation request sent by at least one motorman controller of the railway train.

Optionally, in the activation control apparatus for a railway train provided by the embodiment of the present disclosure, the second determining element 44 includes: a sending module, configured to send, when there is one motorman controller sending the at least one activation request, a circuit signal to a target relay, the target relay corresponds to the target motorman controller; and an establishment module, configured to establish, after the target relay receives the circuit signal, a communication connection between the target motorman controller and a control communication network of the railway train, the control communication network is used for transmitting at least one control signal of the railway train.

Optionally, in the activation control apparatus for a railway train provided by the embodiment of the present disclosure, after the target relay receives the circuit signal, the method further includes that: a train line of the railway train is powered on; and when it is determined that the train line of the railway train has been powered on, target information is fed back, the target information is used for representing that the target motorman controller has controlled the railway train.

The activation control apparatus for a railway train provided by the embodiment of the present disclosure includes: a first receiving element 41, configured to receive at least one activation request sent by at least one motorman controller of the railway train; a first determining element 42, configured to determine a number of at least one motorman controller sending the at least one activation request; a control element 43, configured to control, when there are a plurality of motorman controllers that send the at least one activation request, the railway train to perform an emergency braking; and a second determining element 44, configured to determine that, when there is one motorman controller sending the at least one activation request, a target motorman controller has a permission to control the railway train, wherein the target motorman controller is a unique motorman controller sending the at least one activation request. The problem in the related art of potential safety hazard of a double-vehicle activation processing method is solved.

The activation control apparatus for a railway train includes a processor and a memory. The first receiving element 41, the first determining element 42, the control element 43, the second determining element 44 and the like are stored in the memory by serving as program elements, and the processor executes the program elements stored in the memory to implement corresponds functions.

The processor includes a kernel, which calls a corresponds program element from the memory. There may be one or more kernels, and kernel parameters are adjusted to guarantee the safe drive of the railway train.

The memory may include a volatile memory, a Random Access Memory (RAM) and/or a non-volatile memory in a computer-readable medium such as a Read-Only Memory (ROM) or a flash RAM, the memory including at least one storage chip.

The embodiment of the present invention provides a storage medium having a program stored thereon. When the program is executed by a processor, the activation control method for a railway train is implemented.

The embodiment of the present invention provides a processor, which is configured to run a program, wherein when the program is run, the activation control method for a railway train is performed.

The embodiment of the present invention provides a device which includes a processor, a memory and a program that is stored on the memory and may run on the processor. The processor executes the program to implement the following steps that: at least one activation request sent by at least one motorman controller of a railway train is received; a number of at least one motorman controller sending the at least one activation request is determined; when there are a plurality of motorman controllers sending the at least one activation request, the railway train is controlled to perform an emergency braking; and when there is one motorman controller sending the at least one activation request, it is determined that a target motorman controller has a permission to control the railway train, wherein the target motorman controller is a unique motorman controller sending the at least one activation request.

Optionally, a condition of triggering at least one motorman controller of the railway train to send at least one activation request includes that: when a key hole of the motorman controller of the railway train is at an open position, the motorman controller of the railway train sends at least one activation request.

Optionally, after the railway train is controlled to perform an emergency braking, the method further includes that: when it is determined that the key hole of each motorman controller of the railway train is at a closed position, the step of receiving at least one activation request sent by at least one motorman controller of the railway train is continuously performed.

Optionally, before at least one activation request sent by at least one motorman controller of the railway train is received, the method further includes that: state information of the railway train is received, wherein the state information is used for representing a current state of the railway train; and when it is determined that the state information of the railway train satisfies a preset condition, the step of receiving at least one activation request sent by at least one motorman controller of the railway train is continuously performed.

Optionally, when there is one motorman controller sending the at least one activation request, the operation that it is determined that a target motorman controller has a permission to control the railway train includes that: when there is one motorman controller sending the at least one activation request, a circuit signal is sent to a target relay, the target relay corresponds to the target motorman controller; and after the target relay receives the circuit signal, a communication connection between the target motorman controller and a control communication network of the railway train is established, the control communication network is used for transmitting at least one control signal of the railway train.

Optionally, after the target relay receives the circuit signal, the method further includes that: a train line of the railway train is powered on; and when it is determined that the train line of the railway train has been powered on, target information is fed back, the target information is used for representing that the target motorman controller has controlled the railway train. The device herein may be a server, a PC, a PAD, a mobile phone or the like.

The present disclosure also provides a computer program product. When being executed on a data processing device, it is suitable for executing a program initializing the following method steps that: at least one activation request sent by at least one motorman controller of a railway train is received; a number of at least one motorman controller sending the at least one activation request is determined; when there are a plurality of motorman controllers sending the at least one activation request, the railway train is controlled to perform an emergency braking; and when there is one motorman controller sending the at least one activation request, it is determined that a target motorman controller has a permission to control the railway train, wherein the target motorman controller is a unique motorman controller sending the at least one activation request.

Optionally, a condition of triggering at least one motorman controller of the railway train to send at least one activation request includes that: when a key hole of the motorman controller of the railway train is at an open position, the motorman controller of the railway train sends at least one activation request.

Optionally, after the railway train is controlled to perform an emergency braking, the method further includes that: when it is determined that the key hole of each motorman controller of the railway train is at a closed position, the step of receiving at least one activation request sent by at least one motorman controller of the railway train is continuously performed.

Optionally, before at least one activation request sent by at least one motorman controller of the railway train is received, the method further includes that: state information of the railway train is received, wherein the state information is used for representing a current state of the railway train; and when it is determined that the state information of the railway train satisfies a preset condition, the step of receiving at least one activation request sent by at least one motorman controller of the railway train is continuously performed.

Optionally, when there is one motorman controller sending the at least one activation request, the operation that it is determined that a target motorman controller has a permission to control the railway train includes that: when there is one motorman controller sending the at least one activation request, a circuit signal is sent to a target relay, the target relay corresponds to the target motorman controller; and after the target relay receives the circuit signal, a communication connection between the target motorman controller and a control communication network of the railway train is established, the control communication network is used for transmitting at least one control signal of the railway train.

Optionally, after the target relay receives the circuit signal, the method further includes that: a train line of the railway train is powered on; and when it is determined that the train line of the railway train has been powered on, target information is fed back, the target information is used for representing that the target motorman controller has controlled the railway train.

A person skilled in the art should understand that the embodiments of the present disclosure may be provided as a method, a system or a computer program product. Thus, forms of complete hardware embodiments, complete software embodiments or embodiments integrating software and hardware may be adopted in the present disclosure. Moreover, a form of the computer program product implemented on one or more computer available storage media (including, but not limited to, a disk memory, a CD-ROM, an optical memory and the like) containing computer available program codes may be adopted in the present disclosure.

In a typical configuration, a calculation device includes one or more processors (CPU), an input/output interface, a network interface and a memory.

The memory may include a volatile memory, a RAM and/or a non-volatile memory in a computer-readable medium such as a ROM or a flash RAM. The memory is an example of the computer-readable medium.

The computer-readable medium includes permanent and non-permanent media, and mobile and non-mobile media, which may implement information storage by any method or technology. The information may be a computer-readable instruction, a data structure, a program module or other data.

The above is only the preferable embodiments of the present disclosure, and not intended to limit the present disclosure. As will occur to a person skilled in the art, the present disclosure is susceptible to various modifications and changes. Any modifications, equivalent replacements, improvements and the like made within the spirit and principle of the present disclosure shall fall within the scope of claims of the present disclosure.

It is to be noted that the terminology used herein is just for the purpose of describing the embodiments, and is not intended to limit the embodiments. As used herein, the singular forms are also intended to include the plural, unless the context clearly indicates otherwise, and it is also understood that when the terms "include" and/or "include" are used in the specification, which refers to features, steps, operations, devices, components, and/or combinations thereof.

The relative arrangement of the components and the steps, numerical expressions and numerical values set forth in the embodiments are not intended to limit the scope of the invention. In the meantime, it should be understood that the dimensions of the various parts shown in the drawings are not drawn in the actual scale relationship for the convenience of description. Techniques, methods and apparatus known to those of ordinary skilled in the relevant art may not be discussed in detail, but where appropriate, the techniques, methods and apparatus should be considered as part of the authorization specification. In all of the examples shown and discussed herein, any specific values are to be construed as illustrative only and not as a limitation. Accordingly, other examples of the exemplary embodiments may have different values. It should be noted that similar reference numerals and letters indicate similar items in the following figures, and therefore, once an item is defined in one drawing, it is not required to be further discussed in the subsequent figures.

In the description of the present disclosure, it is to be understood that the orientation words such as "front, back, up, down, left, right", "horizontal, vertical" and "top, bottom", etc. are used based on the orientation or positional relationship shown in the drawings, and is merely for the convenience of the description of the present invention and the simplified description, which are not intended to indicate or imply that the components must have a specific orientation or be constructed and operated in a specific orientation, and thus are not to be construed as limiting the scope of the invention; the orientations "inside and outside" refer to the inside and outside of the contours of the components themselves.

For convenience of the description of the present disclosure, the spatially relative terms such as "above", "over", "on", etc., may be used herein to describe the spatial positional relationships between one device or features and other devices or features in the drawings. It will be understood that the spatially relative terms are intended to encompass different orientations of the device in the use or operation in addition to the orientation of the device described in the figures. For example, if the device in the figures is up side down, the device described as "above other devices or structures" or "over other devices or structures" will be positioned "below other devices or structures" or "under other devices or structures". Thus, the exemplary term "above" can include both positions "over" and "under". The device can also be positioned in other different ways (rotated 90 degrees or in other orientations) and the corresponding description of the space used herein is explained accordingly.

In addition, it should be noted that the use of the words "first", "second", etc. to limit the components is only to facilitate the distinction between the components, if there is no additional statements, the above words have no special meaning, so it cannot be understood to limit the scope of protection of the present invention.

What is claimed is:

1. An activation control method for a railway train, comprising:
   receiving at least one activation request sent by at least one motorman controller of the railway train;
   determining a number of at least one motorman controller sending the at least one activation request;
   when there are a plurality of motorman controllers sending the at least one activation request, controlling the railway train to perform an emergency braking; and
   when there is one motorman controller sending the at least one activation request, determining that a target motorman controller has a permission to control the railway train, wherein the target motorman controller is a unique motorman controller sending the at least one activation request.

2. The method as claimed in claim 1, wherein a condition of triggering the at least one motorman controller of the railway train to send the at least one activation request includes that: when a key hole of each of the at least one motorman controller of the railway train is at an open position, sending, by the at least one motorman controller of the railway train, at least one activation request.

3. The method as claimed in claim 2, wherein after controlling the railway train to perform the emergency braking, the method further comprises:

when determining that the key hole of each of the at least one motorman controller of the railway train is at a closed position, continuously performing a step of receiving the at least one activation request sent by the at least one motorman controller of the railway train.

4. The method as claimed in claim 1, wherein before receiving the at least one activation request sent by the at least one motorman controller of the railway train, the method further comprises:
receiving state information of the railway train, wherein the state information is used for representing a current state of the railway train; and
when determining that the state information of the railway train satisfies a preset condition, continuously performing a step of receiving the at least one activation request sent by the at least one motorman controller of the railway train.

5. The method as claimed in claim 1, wherein when there is one motorman controller sending the at least one activation request, determining that the target motorman controller has the permission to control the railway train comprises:
when there is one motorman controller sending the at least one activation request, sending a circuit signal to a target relay, wherein the target relay corresponds to the target motorman controller; and
after determining that the target relay receives the circuit signal, establishing a communication connection between the target motorman controller and a control communication network of the railway train, wherein the control communication network is used for transmitting at least one control signal of the railway train.

6. The method as claimed in claim 5, wherein after the target relay receives the circuit signal, the method comprises:
powering on a train line of the railway train; and
when determining that the train line of the railway train has been powered on, feeding back target information, wherein the target information is used for representing that the target motorman controller has controlled the railway train.

7. A non-transitory storage medium, comprising a stored program, wherein the program performs the activation control method for a railway train as claimed in claim 1.

8. A processor, configured to run a program, wherein the program is run to perform the activation control method for a railway train as claimed in claim 1.

9. An activation control apparatus for a railway train, comprising:
a first receiving element, configured to receive at least one activation request sent by at least one motorman controller of the railway train;
a first determining element, configured to determine a number of at least one motorman controller sending the at least one activation request;
a control element, configured to control the railway train to perform an emergency braking, when there are a plurality of motorman controllers sending the at least one activation request; and
a second determining element, configured to determine that a target motorman controller has a permission to control the railway train, when there is one motorman controller sending the at least one activation request, wherein the target motorman controller is a unique motorman controller sending the at least one activation request.

10. The apparatus as claimed in claim 9, wherein a condition of triggering the at least one motorman controller of the railway train to send the at least one activation request includes that: when a key hole of each of the at least one motorman controller of the railway train is at an open position, sending, by the at least one motorman controller of the railway train, at least one activation request.

* * * * *